United States Patent Office 3,427,331
Patented Feb. 11, 1969

3,427,331
17 - SUBSTITUTED-PREGNA - 5,20 - DIENE COMPOUNDS AND METHODS FOR THEIR PRODUCTION
Duane F. Morrow, Ann Arbor, Mich., assignor to Parke, Davis & Company, Detroit, Mich., a corporation of Michigan
No Drawing. Filed Dec. 29, 1966, Ser. No. 605,563
U.S. Cl. 260—397.1       6 Claims
Int. Cl. C07c 167/36

The present invention relates to new steroid compounds. More particularly, it relates to new 17-substituted-pregna-5,20-diene compounds and to methods for their production.

The compounds of the invention can be represented by the formula

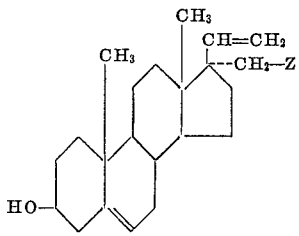

wherein Z represents di-lower alkyl-carbamoyl $$(-CO-NR_1R_2)$$

carboxyl (—COOH), or a carboxylate salt (—COOM). In these formulas each of $R_1$ and $R_2$ represents lower alkyl and M represents one equivalent of a cation. The lower alkyl groups can be the same or different and are preferably methyl or ethyl.

In accordance with the invention, compounds of the invention wherein Z is di-lower alkyl-carbamoyl are produced by reacting pregna-5,17(20)-diene-3β-21-diol with a 1,1-di-(lower alkoxy)-1-(di-lower alkylamino)ethane of the formula

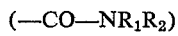

where $R_1$ and $R_2$ are as defined before. The reaction is carried out using at least one equivalent of the 1,1-dialkoxy-1-dialkylaminoethane and preferably a large excess of this reagent, in which case it also serves as a solvent. If desired, an unreactive solvent such as toluene, xylene, mesitylene, or diethylene glycol diethyl ether can also be used. The time and temperature of the reaction can be varied within relatively wide limits. In general, a temperature between about 100–160° C. is used. At the preferred temperature of about 120–130° C., the reaction is substantially complete within about 5 hours.

Also in accordance with the invention, compounds of the invention wherein Z is carboxyl or a carboxylate salt are produced by hydrolyzing an N,N-di-(lower alkyl)-3β-hydroxypregna-5,20-dien-17α-acetamide. The hydrolysis is carried out by heating with a basic or acidic hydrolytic agent, a basic agent being preferred. Some examples of suitable hydrolytic agents are potassium hydroxide or sodium hydroxide in a high boiling alcohol or ether containing a small amount of water. High boiling alcohols and ethers which can be used include amyl alcohol, octyl alcohol, ethylene glycol, propylene glycol, diethylene glycol, triethylene glycol, and diethylene glycol dimethyl ether. Normally an excess of the hydrolytic agent is used. The time and temperature of the reaction can be varied within rather wide limits, for example from about 125 to 250° C. for from 2 to 48 hours, the longer reaction times being used at the lower temperatures. The preferred temperature range is about 160–195° C. When the hydrolysis is carried out under basic conditions, the product is present as a salt and it can be isolated in that form, or, following acidification, as the free carboxylic acid.

The carboxylic acid of the invention, that is, the compound in which Z represents carboxyl, forms salts with a variety of inorganic and organic bases. Salts are formed with such bases as sodium hydroxide, sodium carbonate, sodium bicarbonate, potassium hydroxide, calcium hydroxide, ammonia, diethylamine, and ethanolamine. The free acid and salts are readily interconvertible and are essentially equally useful for the purposes of the invention.

The compounds of the invention are useful chemical intermediates. By methods generally known in organic chemistry they can be converted to pharmacologically active compounds. For example, 3β-hydroxypregna-5,20-dien-17α-acetic acid is dissolved in methanol and treated with aqueous potassium bicarbonate to form the potassium salt, which is then reacted with iodine in aqueous potassium iodide to produce an iodolactone. This iodolactone is converted to an acetoxylactone by reaction with potassium acetate in dimethylformamide. The acetoxylactone is reacted with lithium aluminum hydride in tetrahydrofuran and the product hydrolyzed to produce the tetraol, 17α - (2-hydroxyethyl)pregn-5-ene-3β,20,21-triol, which is converted by oxidation with periodic acid in aqueous dioxane to produce a hemiacetal. The latter compound is oxidized with silver oxide (freshly prepared from silver nitrate and sodium hydroxide) in aqueous ethanol to 3β,21-dihydroxy-17α-pregn-5-ene-17-carboxylic acid γ-lactone. These transformations are shown by the following partial formulas showing steroid Ring D.

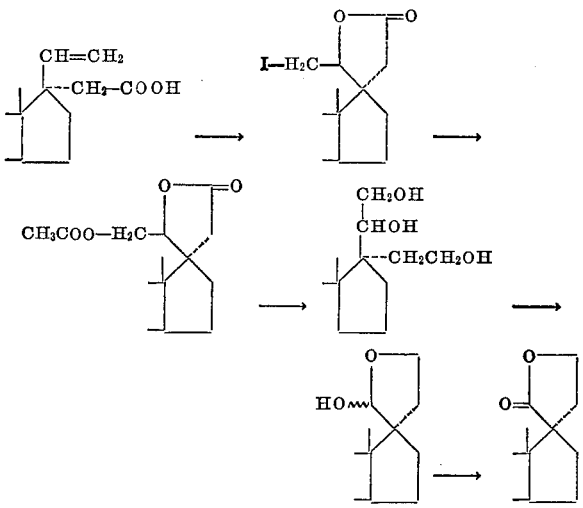

The last compound identified above is converted by oxidation with cyclohexanone and aluminum isopropoxide in toluene followed by hydrolysis of the mixture to produce 21-hydroxy-3-oxo-17α-pregn-4-ene-17-carboxylic acid γ-lactone. This compound can be used in the production of aldosterone antagonists as described, for example, in U.S. Patent 3,257,390.

The invention is illustrated by the following examples.

EXAMPLE 1

A solution of 10.41 g. of pregna-5,17(20)-diene-3β,21-diol in 86 ml. of 1,1-diethoxy-1-dimethylaminoethane is slowly distilled under nitrogen until the temperature reaches 120° C. The mixture is then heated at reflux at 120° C. for 5 hours, cooled, and concentrated to give a residue of crude N,N-dimethyl-3β-hydroxypregna-5,20-dien-17α-acetamide. For purification, the product is triturated with cold methanol and then recrystallized from methanol; M.P. 186–188° C.

EXAMPLE 2

A solution of 5.73 g. of N,N-dimethyl-3β-hydroxypregna-5,20-dien-17α-acetamide in 210 ml. of ethylene glycol is treated with 41.25 g. of potassium hydroxide. The mixture is heated under reflux for 16 hours and then distilled until the temperature reaches 195° C. It is heated at reflux an additional 2 hours and then poured into dilute hydrochloric acid. The insoluble product is collected. It is 3β-hydroxypregna-5,20-dien-17α-acetic acid; M.P. 212–214° C. The sodium, potassium, ammonium, and diethylammonium salts are obtained by reaction with, respectively, sodium hydroxide, potassium hydroxide, ammonia, and diethylamine.

I claim:
1. A compound of the formula

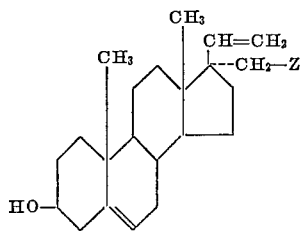

where Z is a member of the class consisting of di-lower alkyl-carbamoyl, carboxyl, and carboxylate salts.

2. A compound according to claim 1 which is N,N-dimethyl-3β-hydroxypregna-5,20-dien-17α-acetamide.
3. A compound according to claim 1 which is 3β-hydroxypregna-5,20-dien-17α-acetic acid.
4. Process for the production of a compound as defined in claim 1 wherein Z is di-lower alkyl-carbamoyl, which comprises reacting pregna-5,17(20)-diene-3β,21-diol with a 1,1-di-(lower alkoxy)-1-(di-lower alkylamino)ethane.
5. Process for the production of a compound as defined in claim 1 wherein Z is carboxyl or a carboxylate salt, which comprises hydrolyzing an N,N-di-(lower alkyl)-3β-hydroxypregna-5,20-dien-17α-acetamide.
6. Process according to claim 5 wherein the hydrolysis is carried out under basic conditions and the product is isolated following acidification.

References Cited

Morrow et al., Journ. Org. Chem., vol. 32, February 1967, pp. 361–69.

LEWIS GOTTS, *Primary Examiner.*

ETHEL G. LOVE, *Assistant Examiner.*

U.S. Cl. X.R.

260—239.57, 397.5, 239.55